(12) United States Patent
Feldpausch et al.

(10) Patent No.: US 11,198,466 B2
(45) Date of Patent: Dec. 14, 2021

(54) WEDGE ADJUSTER PLUG

(71) Applicant: STEERING SOLUTIONS IP HOLDING CORPORATION, Saginaw, MI (US)

(72) Inventors: John M. Feldpausch, Bay City, MI (US); Fred N. Golda, Saginaw, MI (US); Robert J. Bromberek, Saginaw, MI (US); Ryan D. Harris, Birch Run, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 154 days.

(21) Appl. No.: 15/803,612

(22) Filed: Nov. 3, 2017

(65) Prior Publication Data

US 2019/0135329 A1 May 9, 2019

(51) Int. Cl.
  *B62D 3/12* (2006.01)
  *F16H 19/04* (2006.01)
  *F16H 55/28* (2006.01)

(52) U.S. Cl.
  CPC ............. *B62D 3/123* (2013.01); *F16H 19/04* (2013.01); *F16H 55/283* (2013.01)

(58) Field of Classification Search
  CPC ... F16H 19/04; F16H 1/26; F16H 1/16; F16H 55/283; B62D 3/123
  USPC ....................................................... 220/327
  See application file for complete search history.

(56) References Cited

U.S. PATENT DOCUMENTS

| | | | |
|---|---|---|---|
| 3,762,240 A | 10/1973 | Adams | |
| 4,788,878 A * | 12/1988 | Morita | B62D 3/123 74/409 |
| 5,125,290 A * | 6/1992 | Cotter | F16H 19/04 184/99 |
| 6,392,418 B1 | 5/2002 | Mir et al. | |
| 7,042,227 B2 | 5/2006 | Mir et al. | |
| 7,487,984 B1 * | 2/2009 | Lemont, Jr. | B62D 3/123 280/93.514 |

(Continued)

FOREIGN PATENT DOCUMENTS

| | | |
|---|---|---|
| CN | 1278219 A | 12/2000 |
| CN | 1675484 A | 9/2005 |

(Continued)

OTHER PUBLICATIONS

Chinese First Office from the Chinese Patent Office for CN Application No. 201710363597X dated Nov. 22, 2018, 14 pages, English Translation Included.
English translation of First Office Action and Search Report regarding corresponding CN App. No. 201811305608.X; dated Jun. 24, 2021.

*Primary Examiner* — Randell J Krug
(74) *Attorney, Agent, or Firm* — Dickinson Wright PLLC

(57) ABSTRACT

A rack and pinion steering system includes a rack housing, a rack bearing, and an adjuster plug. The rack housing defines a rack housing bore extending along an axis. The rack bearing is disposed within the rack housing bore. The rack bearing has a first bearing portion that is biasingly connected to a second bearing portion. The first bearing portion and the second bearing portion extend along the axis between a first rack bearing end and a second rack bearing end. The adjuster plug is disposed within the rack housing bore. The adjuster plug extends along the axis between a first adjuster plug end that engages the second rack bearing and a second adjuster plug end.

4 Claims, 3 Drawing Sheets

(56) References Cited

U.S. PATENT DOCUMENTS

| | | | |
|---|---|---|---|
| 7,584,816 B2 | 9/2009 | Miyajima et al. | |
| 7,849,957 B2 | 12/2010 | Hara et al. | |
| 2005/0150372 A1* | 7/2005 | Nguyen | B62D 3/123 |
| | | | 91/508 |
| 2008/0202271 A1* | 8/2008 | Heo | B62D 3/123 |
| | | | 74/422 |
| 2009/0234538 A1 | 9/2009 | Ta et al. | |
| 2009/0249902 A1* | 10/2009 | Rombold | F16H 55/283 |
| | | | 74/29 |
| 2011/0193331 A1* | 8/2011 | Heo | B62D 3/123 |
| | | | 280/779 |
| 2013/0068048 A1* | 3/2013 | Bareis | B62D 3/123 |
| | | | 74/55 |
| 2014/0013901 A1 | 1/2014 | Urbach | |
| 2015/0166097 A1* | 6/2015 | Lingemann | F16H 55/283 |
| | | | 74/409 |
| 2015/0166098 A1* | 6/2015 | Lingemann | B62D 3/123 |
| | | | 74/409 |
| 2017/0334478 A1 | 11/2017 | Douglas et al. | |
| 2017/0346424 A1 | 11/2017 | Pramod et al. | |

FOREIGN PATENT DOCUMENTS

| | | | | |
|---|---|---|---|---|
| CN | 101044341 A | 9/2007 | | |
| CN | 101314361 A | 12/2008 | | |
| CN | 102145708 A | 8/2011 | | |
| CN | 102837728 A | 12/2012 | | |
| EP | 2754600 B1 * | 1/2016 | | F16H 55/283 |
| JP | H07232650 A | 9/1995 | | |

* cited by examiner

WEDGE ADJUSTER PLUG

BACKGROUND

A rack and pinion steering system functions to convert rotational motion to linear motion. The rack and pinion steering system may include an elongated steering rack (i.e., toothed bar), tie rods, a steering shaft and a pinion gear. The tie rods may be connected to at least one steerable wheel that is attached to the steering rack. The pinion gear operably meshes with the teeth of the steering rack such that in response to the rotation of the steering shaft, the pinion gear rotates and moves the rack in a linear fashion.

System components, such as a rack yoke or rack shoe, may facilitate the operable meshing of the pinion gear to the rack. Axial or radial clearance between the rack yoke or rack shoe and a mating component may lead to undesirable noises, provide a less than desirable steering feel performance, or add to system complexity.

Accordingly, it is desirable to minimize system noise, improve steering feel performance, reduce system complexity, and improve the reliability of meshing to the pinion gear to the rack.

SUMMARY

Disclosed is a rack and pinion steering system that includes a rack housing, a rack bearing, and an adjuster plug. The rack housing defines a rack housing bore extending along an axis. The rack bearing is disposed within the rack housing bore. The rack bearing has a first bearing portion that is biasingly connected to a second bearing portion. The first bearing portion and the second bearing portion extend along the axis between a first rack bearing end and a second rack bearing end. The adjuster plug is disposed within the rack housing bore. The adjuster plug extends along the axis between a first adjuster plug end that engages the second rack bearing and a second adjuster plug end.

In addition to one or more of the features described herein, the rack bearing is made of a non-metallic material.

In addition to one or more of the features described herein, the rack bearing includes a spring element that extends between the first bearing portion and the second bearing portion.

In addition to one or more of the features described herein, a rack supported by the rack housing and engages a gear.

In addition to one or more of the features described herein, the rack and the gear are preloaded axially against each other by the rack bearing.

In addition to one or more of the features described herein, the first bearing portion and the second bearing portion are biased towards engagement with the rack housing bore.

In addition to one or more of the features described herein, the second rack bearing end defines a rack bearing engagement surface.

In addition to one or more of the features described herein, the first adjuster plug end defines an adjuster plug engagement surface.

In addition to one or more of the features described herein, the rack bearing engagement surface is disposed in a nonparallel and a non-perpendicular relationship with respect to the first rack bearing end.

In addition to one or more of the features described herein, the adjuster plug engagement surface is disposed in a nonparallel and a non-perpendicular relationship with respect to the second adjuster plug end.

In addition to one or more of the features described herein, engagement between the rack bearing engagement surface and the adjuster plug engagement surface further biases the first bearing portion and the second bearing portion towards engagement with the rack housing bore.

In addition to one or more of the features described herein, a biasing member is disposed between and engages the rack bearing and the adjuster plug.

In addition to one or more of the features described herein, the biasing member axially biases the first rack bearing end against the rack.

Also disclosed is an adjuster plug for a rack and pinion steering system. The adjuster plug includes an adjuster plug body that extends between a first adjuster plug end and a second adjuster plug end along an axis. The first adjuster plug end defines an adjuster plug engagement surface that is disposed in a nonparallel and a non-perpendicular relationship with respect to the second adjuster plug end.

In addition to one or more of the features described herein, the adjuster plug body defines a sealing recess that is disposed between the first adjuster plug end and the second adjuster plug end and extends towards the axis.

In addition to one or more of the features described herein, the adjuster plug body defines a first recess that axially extends from the first adjuster plug end towards the second adjuster plug end.

In addition to one or more of the features described herein, the adjuster plug body defines a second recess that is disposed concentrically with the first recess and axially extends from the first adjuster plug end towards the second adjuster plug end.

In addition to one or more of the features described herein, a retainer is radially disposed between the first recess and the second recess.

In addition to one or more of the features described herein, the adjuster plug body defines a central opening that extends through the second recess and axially extends towards the second adjuster plug end.

In addition to one or more of the features described herein, the adjuster plug body defines a socket that extends from the second adjuster plug end towards the first adjuster plug end.

Further disclosed is a rack bearing for a rack and pinion steering system. The rack bearing includes a first bearing portion biasingly connected to a second bearing portion. The first bearing portion and the second bearing portion each extend along a first axis between a first rack bearing end and a second rack bearing end. The second rack bearing end defines a rack bearing engagement surface that is disposed in a nonparallel and a non-perpendicular relationship with respect to the first rack bearing end.

In addition to one or more of the features described herein, the rack bearing engagement surface is arranged to engage an adjuster plug engagement surface of an adjuster plug.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are appar

DETAILED DESCRIPTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
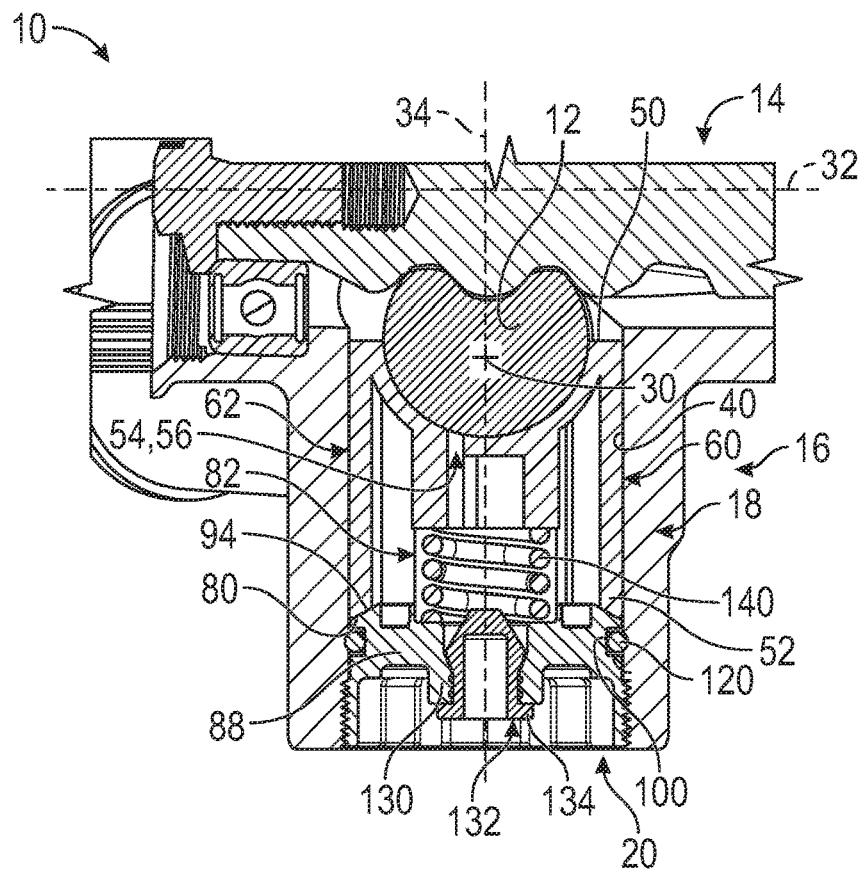
- FIG. 1 is a partial cross-sectional view of a rack and pinion steering system.

Referring to FIG. 1, a rack and pinion steering system 10 is shown. The rack and pinion steering system 10 includes an elongated steering rack 12, a gear 14, a rack housing 16, a rack bearing 18, and an adjuster plug 20.

The elongated steering rack 12 is rotatably supported by the gear 14. The elongated steering rack 12 may be provided with a plurality of teeth, threads, or the like that extend along a length of the elongated steering rack 12. The gear 14 may be a pinion gear that is meshingly engaged with the elongated steering rack 12. The gear 14 may be attached to a steering shaft and may rotate about an axis of rotation 32. Rotation of the gear 14 about the axis of rotation 32 translates the elongated steering rack 12 along an axis of translation 30.

The elongated steering rack 12 and the gear 14 are preloaded axially, relative to a rack housing axis 34, against each other by the rack bearing 18. The axial preloading between the elongated steering rack 12 and the gear 14 ensures meshed engagement between the elongated steering rack 12 and the gear 14.

The rack housing 16 defines a rack housing bore 40 that extends along the rack housing axis 34. The rack housing axis 34 may be disposed transverse to each of the gear 14 and the axis of translation 30 of the elongated steering rack 12.

The rack bearing 18 is disposed within the rack housing bore 40. The rack bearing 18 is arranged to transfer a preload to the elongated steering rack 12 and the gear 14 by having the ability to slide within the rack housing bore 40. The rack bearing 18 is arranged to expand radially, relative to the rack housing axis 34, to radially preload the rack bearing 18 against the rack housing bore 40 and de-lash the rack bearing 18 against the rack housing bore 40.

The rack bearing 18 extends along the rack housing axis 34 or an axis that is disposed substantially parallel to the rack housing axis 34 between a first rack bearing end 50 and a second rack bearing end 52. The first rack bearing end 50 may be provided with a profile that generally matches the profile of the elongated steering rack 12 such that the first rack bearing end 50 extends partially about the elongated steering rack 12. The first rack bearing end 50 is arranged to engage the elongated steering rack 12 and the second rack bearing end 52 engages the adjuster plug 20.

Figure 2:
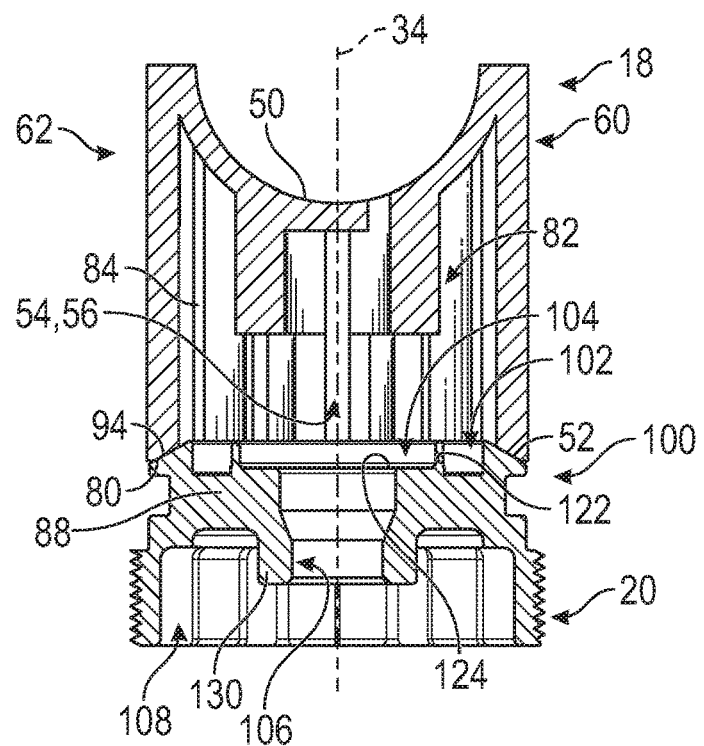
FIG. 2 is a partial cross-sectional view of a rack bearing and an adjuster plug of the rack and pinion steering system.
Figure 3:
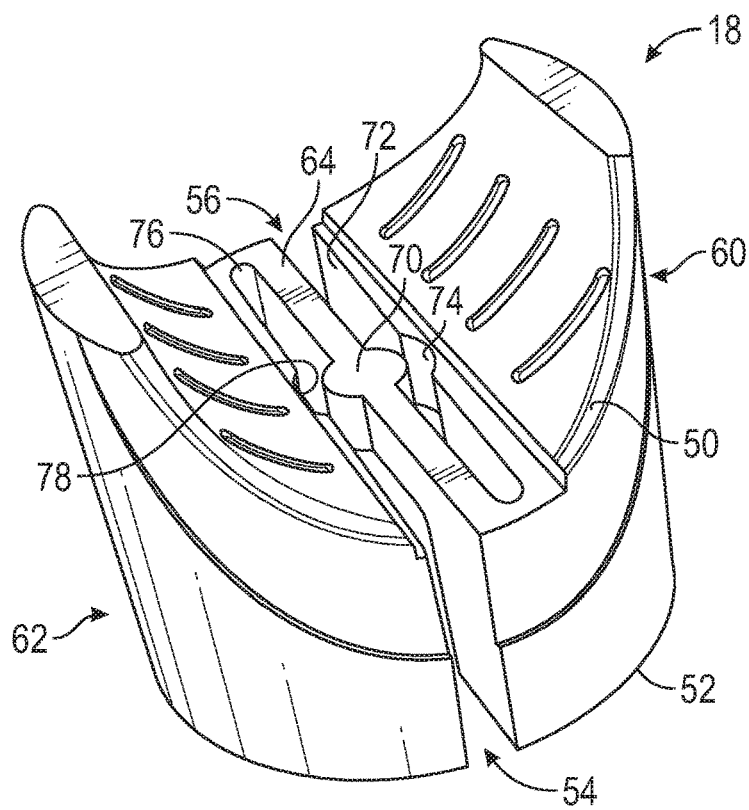
FIG. 3 is a first perspective view of the rack bearing.
Figure 4:
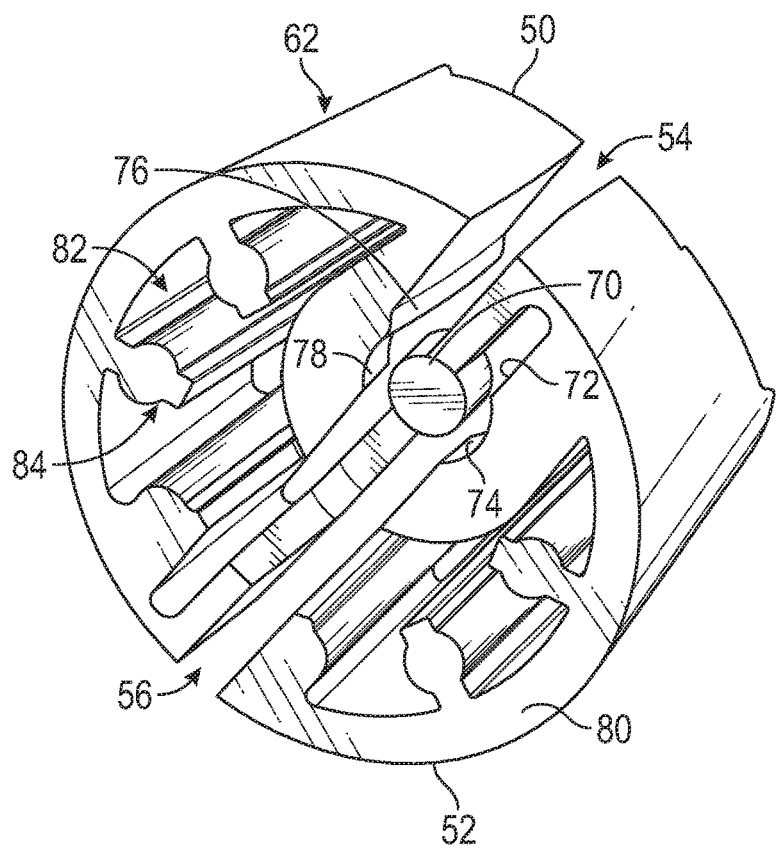
FIG. 4 is a second perspective view of the rack bearing.

The rack bearing 18 defines a first slot 54 (as shown in FIGS. 1 and 2), and in some embodiments a second slot 56 (as shown in FIGS. 3 and 4), that extends at least partially through the rack bearing 18 such that the rack bearing 18 is partially segmented into a first bearing portion 60 and a second bearing portion 62 that are biasingly connected to each other.

The first slot 54 and/or the second slot 56 generally pass through the center of the rack bearing 18. At least one of the first slot 54 and/or the second slot 56 is radially offset from, not disposed within a common imaginary plane, the axis along which the rack bearing 18 may extend. As shown in FIG. 1, at least one of the first slot 54 and/or the second slot 56 is radially offset from the rack housing axis 34.

The at least partial segmenting of the rack bearing 18 into the first bearing portion 60 and the second bearing portion 62 by at least one of the first slot 54 and/or the second slot 56 defines a gothic arch or a spring element 64 that extends between the first bearing portion 60 and the second bearing portion 62 to de-lash the rack bearing 18 against the rack housing bore 40.

In the embodiments shown in FIGS. 1-4, the spring element 64 may be a portion of flexible material that is defined by the first slot 54 and/or the second slot 56. The spring element 64 allows the rack bearing 18 to radially expand, such that external surfaces of the first bearing portion 60 and the second bearing portion 62 are biased towards engagement with the rack housing bore 40. In embodiments in which at least one of the first slot 54 and/or the second slot 56 extends substantially to completely through the rack bearing 18, the spring element 64 may be a separately provided biasing member that extends between the first bearing portion 60 and the second bearing portion 62.

The spring element 64 radially preloads the first bearing portion 60 and the second bearing portion 62 of the rack bearing 18 against the rack housing bore 40. The radial preloading of the rack bearing 18 against the rack housing bore 40 may provide a line to line fit between external surfaces of the first bearing portion 60 and the second bearing portion 62 between the rack bearing 18 and the rack housing bore 40. The radial preloading between external surfaces of the first bearing portion 60 and the second bearing portion 62 and the rack housing bore 40 along with the axial preloading of the rack bearing 18 against the elongated steering rack 12 improves system rattle, clunk, and steering feel performance of the rack and pinion steering system 10.

The rack bearing 18 may be made of a non-metallic material such as a polymer. The rack bearing 18 may be an injection molded plastic rack bearing.

The spring element 64 hingedly or biasingly connects the first bearing portion 60 to the second bearing portion 62 such that the first bearing portion 60 and the second bearing portion 62 radially expand or contract relative to each other responsive to changes in rack load or temperature. As temperature increases, the rack bearing 18 may thermally grow and radially expand within the rack housing bore 40. As temperature decreases, the rack bearing 18 may thermally contract and the spring element 64 may aid in radially expanding the rack bearing 18 so the first bearing portion 60 and the second bearing portion 62 remain in engagement with the rack housing bore 40.

Referring to FIGS. 3 and 4, the spring element 64 may include a central portion 70. The central portion 70 may be a bulbous member or a generally circular member that is substantially centered within the rack bearing 18. The central portion 70 may be disposed between and spaced apart from ends of the spring element 64 that are directly connected to the first bearing portion 60 and the second bearing portion 62. A first inner surface 72 of the first bearing portion 60 may define a first recess 74 that is arranged to at least partially receive the central portion 70. A second inner surface 76 of the second bearing portion 62 may define a second recess 78 that is arranged to at least partially receive the central portion 70. The central portion 70 may be at least partially received within at least one of the first recess 74 and/or the second recess 78.

Referring to FIGS. 1-4, the second rack bearing end 52 defines a rack bearing engagement surface 80 that is arranged to engage the adjuster plug 20. The rack bearing engagement surface 80 is disposed in a nonparallel and a non-perpendicular relationship with respect to the first rack bearing end 50. A portion of the rack bearing engagement surface 80 of the first bearing portion 60 may become progressively closer to the first rack bearing end 50 in a direction that radially extends from the exterior surface of the first bearing portion 60 towards the first inner surface 72. A portion of the rack bearing engagement surface 80 of the second bearing portion 62 may become progressively closer to the first rack bearing end 50 in a direction that radially extends from the exterior surface of the second bearing portion 62 towards the second inner surface 76.

Referring to FIGS. 1, 2, and 4, the rack bearing 18 defines a cavity 82 and a plurality of reinforcement members 84. The cavity 82 extends from the second rack bearing end 52 towards the first rack bearing end 50. The plurality of reinforcement members 84 radially extend towards an axis that is disposed substantially parallel to or coplanar with the rack housing axis 34. The plurality of reinforcement members 84 axially extend from the second rack bearing end 52 towards the first rack bearing end 50.

The adjuster plug 20 may affect the radial preloading of the rack bearing 18 against the rack housing bore 40 as well as maintain the centering of the rack bearing 18 within the rack housing bore 40. The adjuster plug 20 is disposed within the rack housing bore 40 and engages the rack bearing 18.

Referring to FIGS. 1, 2, 5, and 6, the adjuster plug 20 includes an adjuster plug body 88 that extends along the rack housing axis 34 or an axis that is disposed substantially parallel to the rack housing axis 34 between a first adjuster plug end 90 and a second adjuster plug end 92. The adjuster plug body 88 may be a unitary body having a single piece construction. The first adjuster plug end 90 defines an adjuster plug engagement surface 94 that engages the rack bearing engagement surface 80.

The adjuster plug engagement surface 94 is disposed in a nonparallel and a non-perpendicular relationship with respect to the second adjuster plug end 92. A portion of the adjuster plug engagement surface 94 may become progressively closer to the second adjuster plug end 92 in a direction that radially extends away from the rack housing axis 34 or an axis that is disposed substantially parallel to the rack housing axis 34.

Engagement between the rack bearing engagement surface 80 and the adjuster plug engagement surface 94 further biases the exterior surfaces of the first bearing portion 60 and the second bearing portion 62 towards engagement with the rack housing bore 40. The amount of radial biasing of the first bearing portion 60 and the second bearing portion 62 towards the rack housing bore 40 may be adjusted by varying an axial position of the adjuster plug 20 relative to the rack bearing 18.

Engagement between the rack bearing engagement surface 80 and the adjuster plug engagement surface 94 balances the separating forces from the elongated steering rack 12 on the opposing side of the rack bearing 18. The separating force from the adjuster plug engagement surface 94 and the spring element 64 enables the rack bearing 18 to maintain contact with the rack housing bore 40, which improves the rack and pinion steering system 10 noise performance.

The adjuster plug body 88 defines a sealing recess 100, a first recess 102, a second recess 104, a central opening 106, and a socket 108.

Referring to FIGS. 1 and 2, the sealing recess 100 is disposed between the first adjuster plug end 90 and the second adjuster plug end 92 and radially extends from an exterior surface of the adjuster plug body 88 towards the axis that is disposed generally parallel to the rack housing axis 34. The sealing recess 100 is arranged to receive a sealing member 120, such as an o-ring, that engages the rack housing bore 40 and may inhibit water intrusion.

Figure 5:
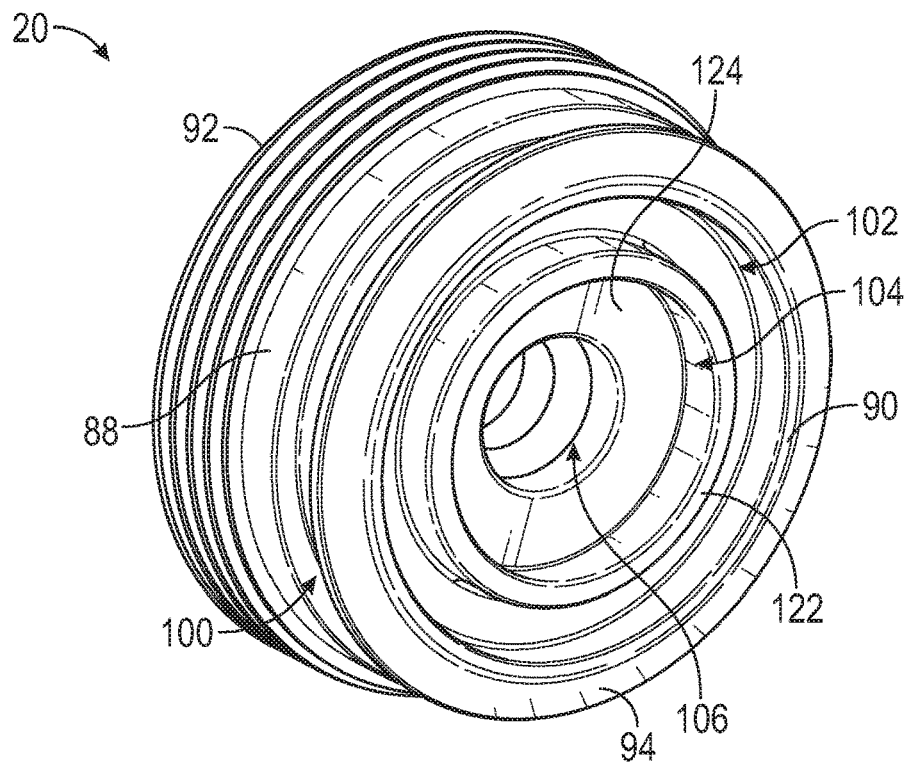
FIG. 5 is a first perspective view of the adjuster plug.

Referring to FIGS. 1, 2, and 5, the first recess 102 axially extends from the first adjuster plug end 90 towards the second adjuster plug end 92. The second recess 104 is disposed concentrically with the first recess 102 and is separated from the first recess 102 by a retainer 122 that is radially disposed between the first recess 102 and the second recess 104. The second recess 104 axially extends from the first adjuster plug end 90 towards the second adjuster plug end 92. The second recess 104 may axially extend towards and terminate at a spring seat 124.

Figure 6:
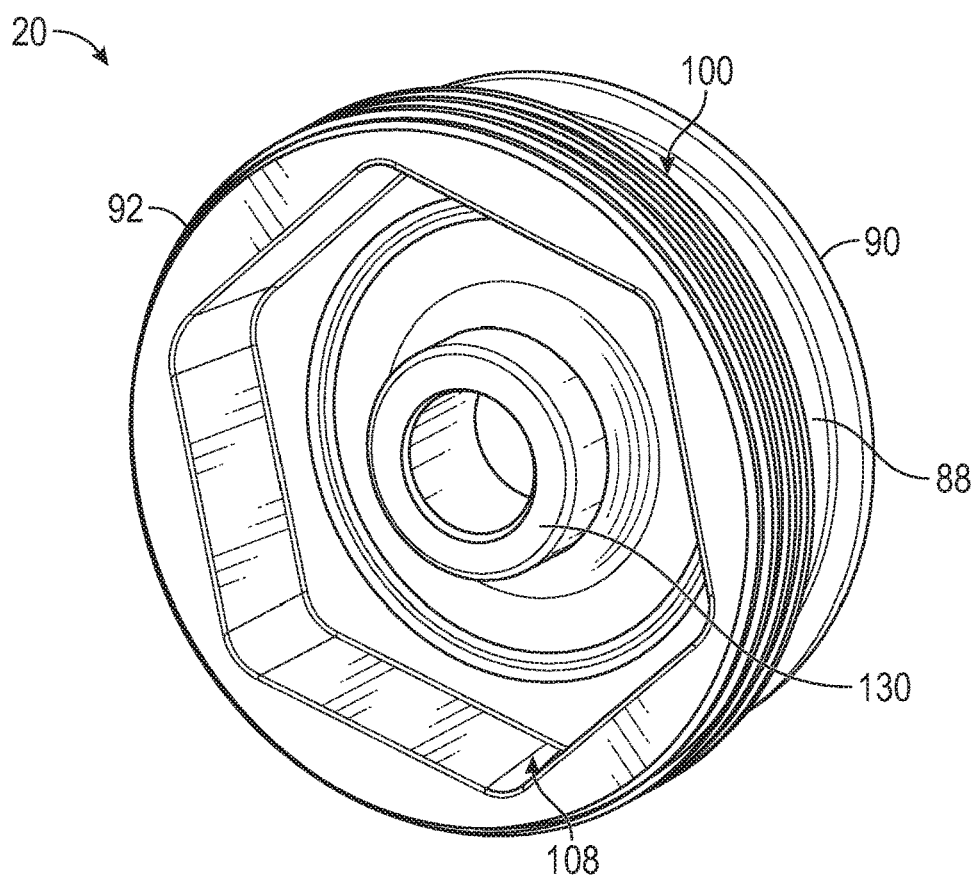
FIG. 6 is a second perspective view of the adjuster plug.

The central opening 106 axially extends through the spring seat 124 of the second recess 104 and extends towards the second adjuster plug end 92. The socket 108 is disposed concentrically with the central opening 106 and is separated from the central opening 106 by a wall 130, as shown in FIG. 6. The socket 108 axially extends from the second adjuster plug end 92 towards the first adjuster plug end 90.

A sealing plug 132 may be at least partially disposed within the socket 108 and may extend into the central opening 106. The sealing plug 132 may include a flange 134 that may abut a distal end of the wall 130.

Referring to FIG. 1, a biasing member 140, e.g. adjuster spring, may be disposed between and engage the rack bearing 18 and the adjuster plug 20. The biasing member 140 is at least partially received within the cavity 82 of the rack bearing 18 and is at least partially received within the second recess 104. The biasing member 140 is at least partially retained within the second recess 104 by the retainer 122. The biasing member 140 applies an axial preload that is transferred by the rack bearing 18 to the elongated steering rack 12. The amount of axial preload provided by the biasing member 140 and the rack bearing 18 may be adjusted by adjusting an axial position of the adjuster plug 20 relative to the rack bearing 18.

The axial preloading and the radial preloading that is applied through the rack bearing 18 compensates for tolerance stack ups as well as minimize system noise, improves steering feel performance, and improves the reliability of meshing between the pinion gear and the rack.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the present disclosure, it is claimed:

1. An adjuster plug for a rack and pinion steering system, comprising:

an adjuster plug body that extends between a first adjuster plug end and a second adjuster plug end along an axis, an entirety of the second adjuster plug end being planar, the first adjuster plug end defining a radially outer adjuster plug engagement surface, the adjuster plug engagement surface extending completely radially outwardly to an outer radial end of the adjuster plug body, an entirety of the adjuster plug engagement surface being disposed in a nonparallel and a non-perpendicular relationship, with respect to the second adjuster plug end, the adjuster plug engagement surface extending in the nonparallel and the non-perpendicular relationship continuously from the outer radial end to an inner radial end of the adjuster plug engagement surface; and a retainer extending axially away from the first adjuster plug end;

wherein a radially outer side of the retainer and the inner radial end of the adjuster plug engagement surface define a first recess radially therebetween, wherein a radially inner side of the retainer at least partially defines a second recess that is disposed concentrically with the first recess.

2. The adjuster plug of claim 1, wherein the adjuster plug body defines a sealing recess that is disposed between the first adjuster plug end and the second adjuster plug end and extends towards the axis.

3. The adjuster plug of claim 1, wherein the adjuster plug body defines a central opening that extends through the second recess and axially extends towards the second adjuster plug end.

4. The adjuster plug of claim 1, wherein the adjuster plug body defines a socket that extends from the second adjuster plug end towards the first adjuster plug end.

\* \* \* \* \*